Figure 1:
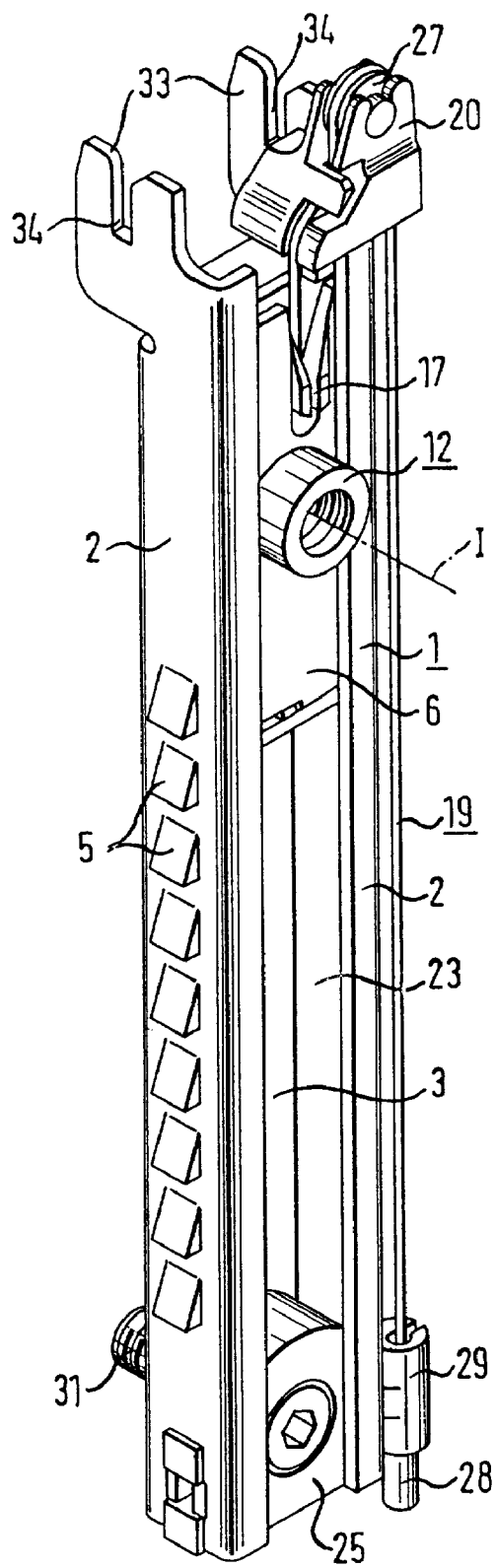

United States Patent

Pleyer et al.

[11] Patent Number: 5,911,439
[45] Date of Patent: Jun. 15, 1999

[54] VERTICAL ADJUSTMENT FOR THE DEFLECTION FITTING OF A SAFETY BELT

[75] Inventors: Matthias Pleyer, Senden; Marko Tetzner, Deutscheinsiedel, both of Germany

[73] Assignee: Takata (Europe) Vehicle Safety Technology GmbH, Ulm, Germany

[21] Appl. No.: 08/845,159

[22] Filed: Apr. 21, 1997

[30] Foreign Application Priority Data

| Apr. 19, 1996 | [DE] | Germany | 196 15 652 |
| Jul. 3, 1996 | [DE] | Germany | 196 76 799 |

[51] Int. Cl.⁶ ................................. B60R 22/20
[52] U.S. Cl. ...................... 280/801.2; 280/808
[58] Field of Search ................ 280/801.2, 808

[56] References Cited

U.S. PATENT DOCUMENTS

| 4,624,479 | 11/1986 | Grunewald | 280/801.2 |
| 4,652,012 | 3/1987 | Biller et al. | 280/801.2 |
| 5,265,908 | 11/1993 | Verellen et al. | 280/801.2 |
| 5,482,325 | 1/1996 | Möller et al. | 280/801.2 |

FOREIGN PATENT DOCUMENTS

| 33 28 798 | 2/1985 | Germany . |
| 38 02 323 | 8/1989 | Germany . |
| 38 44 258 | 7/1990 | Germany . |
| 39 38 612 | 5/1991 | Germany . |
| 43 08 366 | 9/1993 | Germany . |

*Primary Examiner*—Kenneth R. Rice
*Attorney, Agent, or Firm*—Foley & Lardner

[57] ABSTRACT

A device for the automatic and vertically adjustable mounting of the upper attachment fitting or deflection fitting for a safety belt in a motor vehicle, the device comprising a substantially vertically arranged rail (1) having lateral latch recesses (4), a slide member (7) which is displaceably guided along the rail and in which a pawl (8) having a laterally protecting latch nose (10) is pivotally mounted about an axis (I) perpendicular to the longitudinal direction of the rail for movement between a latched position and an unlatched position, an adjustment element (19) which acts on the pawl (8) in the one direction of displacement and is controlled in dependence on the seat position of the associated vehicle seat, and with a bearing (12) for the deflection fitting moveable with the sliding member, with the bearing acting on the pawl (8) in such a way that the pawl (8) is pivoted into its latched position when the bearing (12) is loaded by the belt, wherein, in order to increase the operational reliability and also to simplify the construction and to reduce the manufacturing costs, a resetting element (23) is provided which acts on the pawl (8) in the other direction of displacement and wherein the adjustment element (19) and the resetting element (23) act on the pawl (8) at two points (17, 24) arranged on the same side of the pivot axis (I).

19 Claims, 5 Drawing Sheets

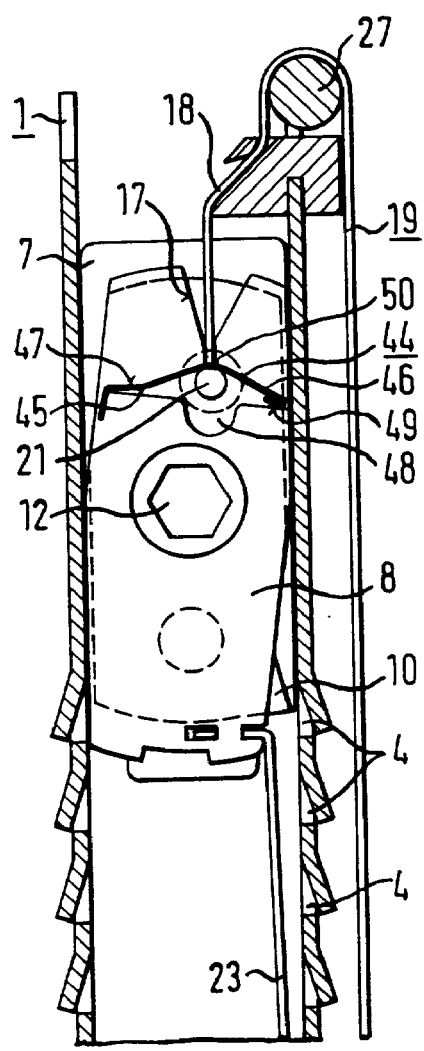
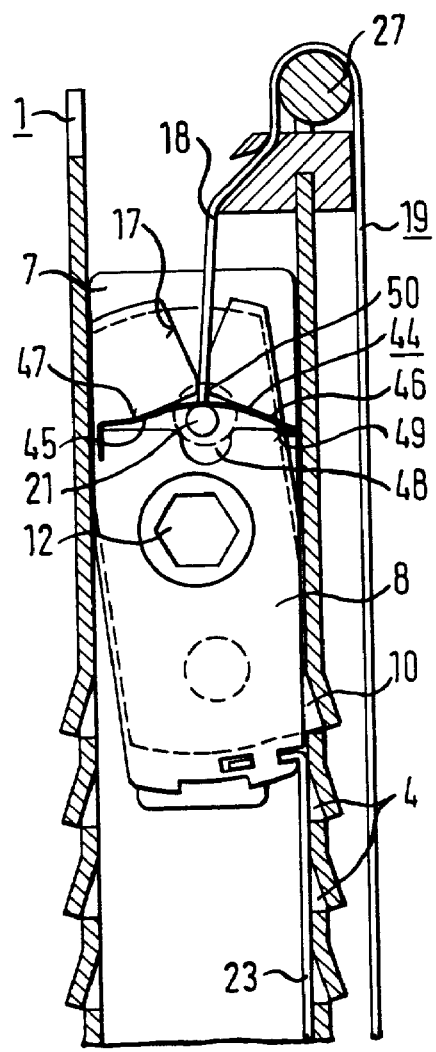

VERTICAL ADJUSTMENT FOR THE DEFLECTION FITTING OF A SAFETY BELT

The present invention relates to a device for the automatic and vertically adjustable mounting of the upper attachment fitting or deflection fitting for a safety belt in a motor vehicle, the device comprising a substantially vertically arranged rail having lateral latch recesses, a slide member which is displaceably guided along the rail and in which a pawl having a laterally protecting latch nose is pivotally mounted about an axis perpendicular to the longitudinal direction of the rail for movement between a latched position and an unlatched position, an adjustment element which acts on the pawl in the one direction of displacement and is controlled in dependence on the seat position of the associated vehicle seat, and with a bearing for the deflection fitting moveable with the sliding member, with the bearing acting on the pawl in such a way that the pawl is pivoted into its latched position when the bearing is loaded by the belt.

A device of this kind is, for example, known from DE 38 02 323 C2. In this known device the pawl is pivotally mounted in the sliding member about a pivot point which is predetermined by the sliding member. The adjustment element acts on the pawl in one direction of pivoting on the one side of the pivot point, whereas the pawl is supported on the other side of the pivot point on a resetting element, which acts in the reverse direction of pivoting. A displacement of the sliding member along the rail is ensured in this way without loading the bearing for the deflection fitting, so that the pawl remains in its unlatched position.

The bearing for the deflection fitting in this known device is fixedly connected to the sliding member. When the bearing is loaded, such as in particular occurs during an accident, the sliding member with the pivot point in the rail is moved downwardly, whereas the pawl is held on the one side of the pivot point by the adjustment element, which is fixed by the seat position. In this way the pawl pivots and latches into one of the lateral latch recesses of the rail, so that the sliding member with the bearing for the deflection fitting is blocked against a further displacement along the rail.

In order to ensure, in a device of this kind, that the sliding member can not only be automatically displaced in the one direction of displacement but rather also in the opposite direction of displacement to the desired position, an additional resetting element is necessary, which acts on the sliding member in the corresponding other direction of displacement. As a whole, this results in a relatively complicated construction which has a negative effect both with respect to manufacturing costs and also to the operational reliability of the device.

The present invention is thus based on the object of so further developing a device of the named kind that these disadvantages do not occur. In particular it is intended to simplify the construction of the device in order to reduce the manufacturing costs and to increase the operational reliability despite ensuring a reliable displacement of the sliding member in both directions.

This object is satisfied in accordance with the invention in that a resetting element is provided which acts on the pawl in the other direction of displacement, and in that the adjustment element and the resetting element act on the pawl at two points arranged on the same side of the pivot axis.

Through the arrangement of the resetting element and of the adjusting element in such a way that they act on the pawl in opposite directions at points arranged on the same side of the pivot axis it is ensured that no resulting torque acts on the pawl on actuation of the adjustment element. The pawl thus remains in its unlatched position during the displacement of the sliding member without loading of the bearing for the deflection fitting. The resetting element provided in accordance with the invention thus has a double function. On the one hand, the resetting element transmits to the sliding member a displacement force which counteracts the adjustment element, and, on the other hand, the resetting element prevents a latching of the pawl during the adjustment of the device, i.e. when the bearing is not loaded. A separate resetting element, which prevents the latching, can thus be omitted. In this way one obtains a device which is improved in its operation but nevertheless simplified in its construction, with the device being characterized by reduced manufacturing costs and increased durability, since fewer parts are present which could be subjected to wear or which could fail.

In accordance with one embodiment of the invention the bearing for the deflection fitting is arranged at the pawl, with the arrangement being horizontally displaced relative to the point of action of the adjustment element. This displaced arrangement causes the pawl to be pivoted relative to the sliding member into its latched position when the bearing for the deflection fitting is loaded, since the adjustment element fixed by the seat position counteracts the draw movement downwardly transmitted from the belt to the bearing. The force picked up by the bearing is thereby directly transmitted to the pawl, so that the sliding member does not have to be laid out for this high force. It is not even necessary to provide a rotary bearing at the sliding member, although a rotary bearing of this kind is provided in accordance with a preferred embodiment of the invention.

In accordance with a further development of the invention the bearing for the deflection fitting arranged at the pawl is provided on the axis of rotation of the pawl in the sliding member. A force transmitted by the belt onto the bearing for the deflection fitting thus acts vertically downwardly on the axis of the rotary bearing and attempts to displace the pawl downwardly along the rail. As a result of the adjustment element acting on the pawl at a position displaced relative to the bearing of the deflection fitting, a resultant torque thereby arises which leads to a pivoting of the pawl and to it latching into the lateral latch recesses of the rail.

In accordance with a further embodiment of the invention the pawl has a through-guide through which the narrower section of an elongate stepped spigot forming a bearing for the deflection fitting passes, with the broader section of the spigot being formed as a rotary bearing spigot which is rotatably journalled in a corresponding circular recess of the slide member. Through this design a simple rotary mounting of the pawl in the slide member is achieved on the one hand. On the other hand, the stepped design of the spigot has the advantage that the spigot cannot be drawn out of the pawl when the deflection fitting is loaded by the belt. In order to ensure a reliable seat of the bearing for the deflection fitting in the pawl even during normal operation of the device, the narrower section of the stepped spigot is preferably inserted into the pawl in a press seating.

In accordance with a further development of the invention, the pawl is mounted in a two-part housing, the lower housing part of which serves as the slide member and the upper housing part of which together with the pawl can be pivoted in the plane of the rail relative to the lower part of the housing, with the adjustment element and the resetting element acting on the upper part of the housing. This design enables a simple attachment of the adjustment element and of the resetting element to the upper part of the housing, which can in particular be manufactured of plastic, and simultaneously enables a design of the pawl in a particularly stable material, in particular in metal.

A cable, in particular a Bowden cable, preferably serves as the adjustment element for the displacement of the sliding member or of the rail. The Bowden cable is thereby preferably guided by a deflection device and acts from above on the pawl or on the upper part of the housing. The other end of the Bowden cable is moved on displacement of the vehicle seat in such a way that the Bowden cable is extended further in the frontmost seat position, so that the deflection fitting is located in its lowermost position. Vice versa, the Bowden cable pulls the deflection fitting into its uppermost position when the vehicle seat is located in its rearmost position. The resetting element, which thus biases the deflection fitting into its lowermost position, acts correspondingly in this embodiment on the lower end of the pawl or of the housing upper part. On extension of the Bowden cable it is ensured that the deflection fitting is displaced downwardly into the desired position.

In accordance with a further development of the invention, a spiral spring is provided as the resetting element, with the spiral spring preferably being mounted in a spring sleeve which can be anchored in the rail and which has a central through-guide for an attachment bolt. The spring sleeve thus also serves for the attachment of the rail to the vehicle in addition to the mounting of the spiral spring. Furthermore, the spring sleeve can also be provided with a lateral recess for the end of the sleeve of the Bowden cable, so that the spring sleeve also takes on a further function. The manufacture and assembly costs are further reduced by this multipurpose function of the spring sleeve.

In accordance with a further development of the invention, a spreading spring element is provided at the pawl which is held in the non-spread position by the tension force acting between the adjustment element and the resetting element, with the spreading spring element being so arranged between the pawl and the sliding member, or between the pawl and the rail, that the pawl is loaded in the direction towards its latched position when the tension force from the spreading spring element falls away. Through the spreading spring element it is advantageously ensured that the pawl reliably latches even when there is a defect of the adjustment element or of the resetting element or of a part associated therewith, for example, a fracture or shifting of the Bowden cable out of its mounting, and that the sliding member with the bearing for the deflection fitting is blocked against a vertical displacement. With a defect of the adjustment element the tension force disappears so that the spreading spring element spreads and pivots the pawl into its latched position.

The spreading spring element is preferably formed as a bow member with two resilient limbs and is braced in the spread state with its one limb against the pawl and with its other limb against the sliding member, with the length of span of the bow member being variable in dependence on the tension force. When the tension force is present, the two limbs of the bow member are pivoted together to such an extent that the bow member does not exert any pivoting force on the pawl. If the tension force disappears, then the bow member spreads and loads the pawl in the latching direction.

In accordance with a further design of the invention, the pawl has a contact edge for at least a respective part of the two limbs of the bow member and the bow member is held by the tension force against the contact edge in such a way that the two limbs are pivoted together to such an extent that the pawl is relieved from the bow member. The contact edge is preferably formed by a recess in the region of the point of action of the adjustment element, and the adjustment element can preferably act at the point of connection of the two limbs of the bow member and pull the bow member against the contact edge. Through this design the spreading spring element is integrated into the pawl in an elegant manner and is held by the adjustment element, for example by the Bowden cable, in the non-spread position as long as no breakage occurs. If the Bowden cable breaks, or if it is unintentionally shifted from its mounted position, then the tension force of the Bowden cable on the bow member disappears so that the bow member can spread apart and its two limbs can load the pawl in the latching direction.

In order to additionally enable an individual adaptation of the level of the deflection fitting in a device for the automatic vertical adjustment of the deflection fitting, provision is made in accordance with a further development of the invention that the distance of the deflection device for the Bowden cable from the upper end of the rail should be manually adjustable. For each length of the Bowden cable set via the seat position, it is thus possible to additionally vary the thereby preset height of the deflection fitting over a specific range. Thus account can be taken of the fact that the seat position selected by a person does not always fully correlate with their body size or shoulder height.

For the additional manual adjustment the deflection device has, in accordance with a further development of the invention, a lever element which is rotatably journalled about a substantially horizontal axis and which carries a deflection element for the Bowden cable and an actuating element, with the deflection element being arranged closer to the axis of rotation of the lever element than the actuating element. In this manner the force required for a manual adjustment is advantageously kept low. This is in particular important because during the manual adjustment of the deflection element, the vertically adjustable deflection fitting travels over a path which is twice as long as that of the actuating element.

For the deflection of the Bowden cable, a deflection roller is preferably provided in accordance with a further embodiment of the invention. The friction which occurs on actuation of the Bowden cable is thereby reduced, which, on the one hand, increases the operational reliability of the device and, on the other hand, facilitates an additional manual vertical adjustment.

The device of the invention is suitable for use on both sides in a motor vehicle through the provision of latched recesses at two oppositely disposed sides of the rail. All parts of the device of the invention with the exception of the upper part of the housing can thus be used both for left-hand installation and also for right-hand installation.

At its upper end, the rail is preferably provided with slits to enable it to be hung into a mount provided on the vehicle. The installation of the device of the invention is thereby considerably simplified. The rail is, for example, hung into mount present at the B-column of the vehicle from below and must only be subsequently secured to the B-column by means of the single attachment bolt which is guided through the spring sleeve.

Figure 2:
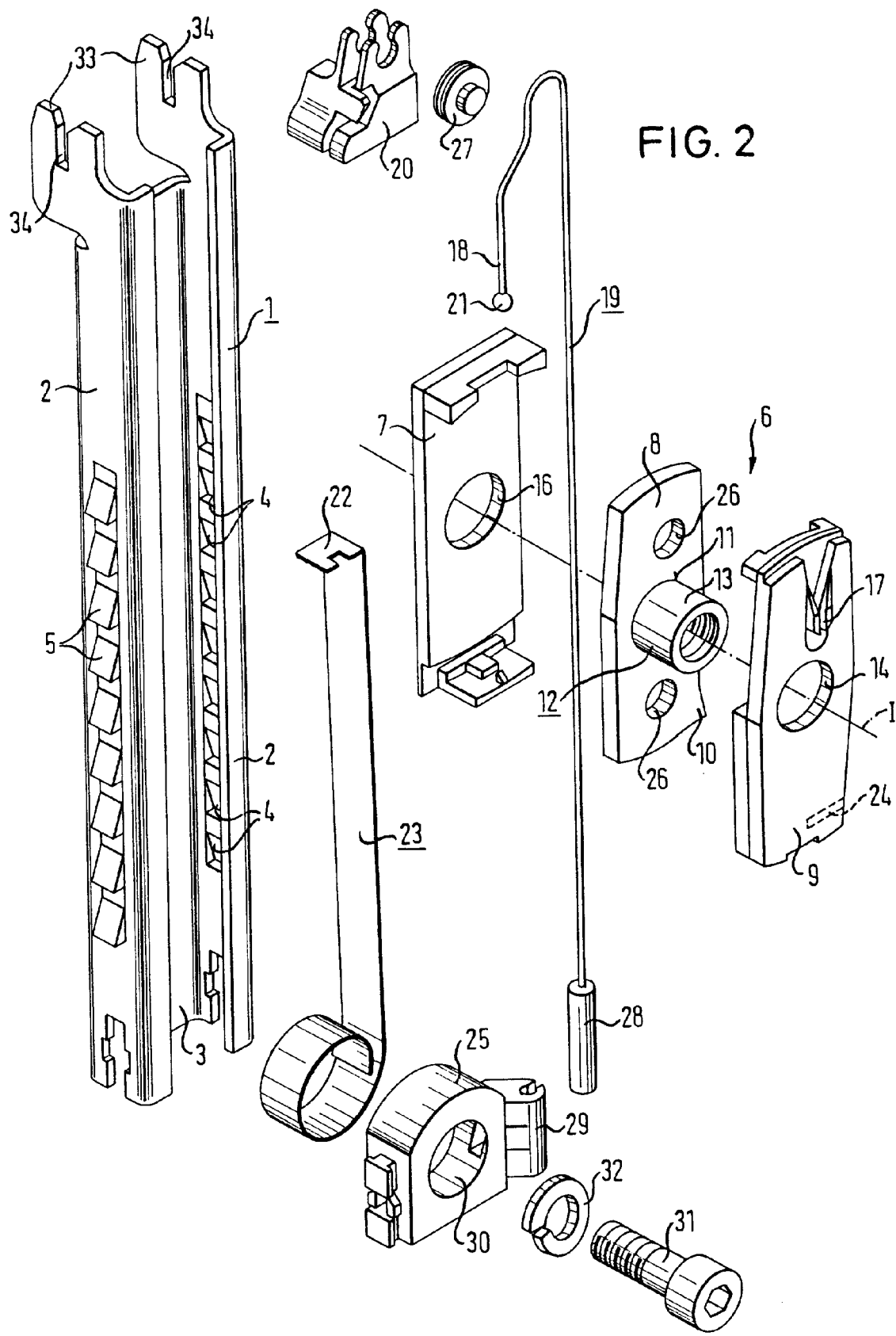
Figure 3:
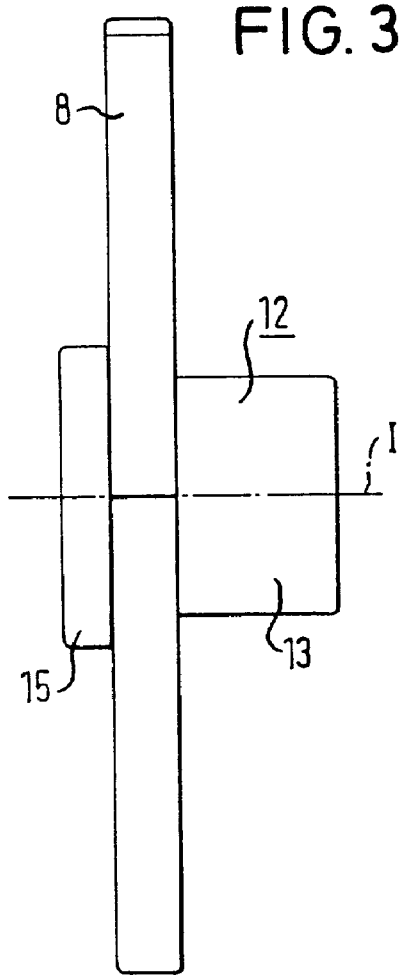
Figure 4:
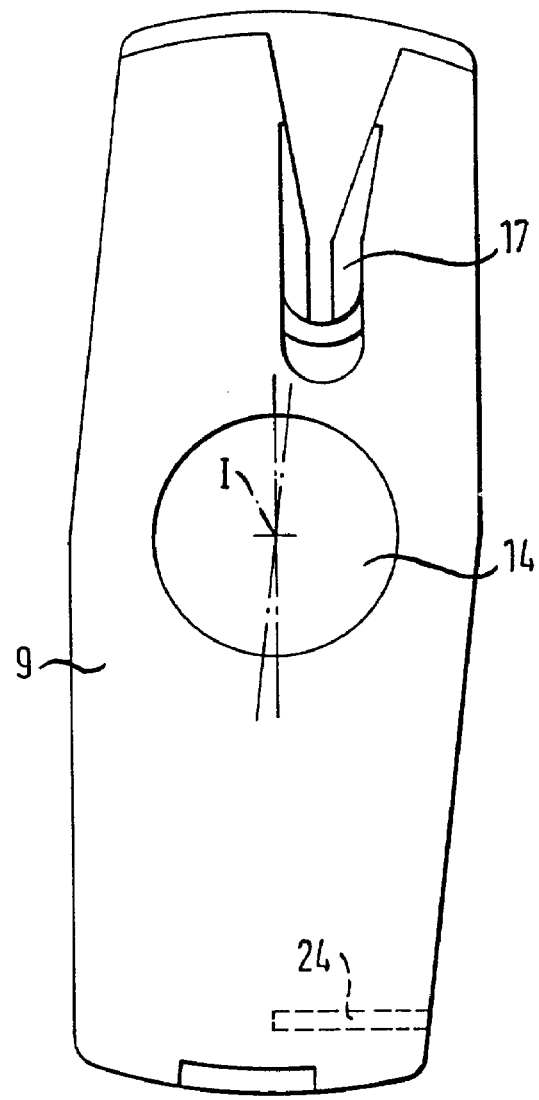
Figure 5:
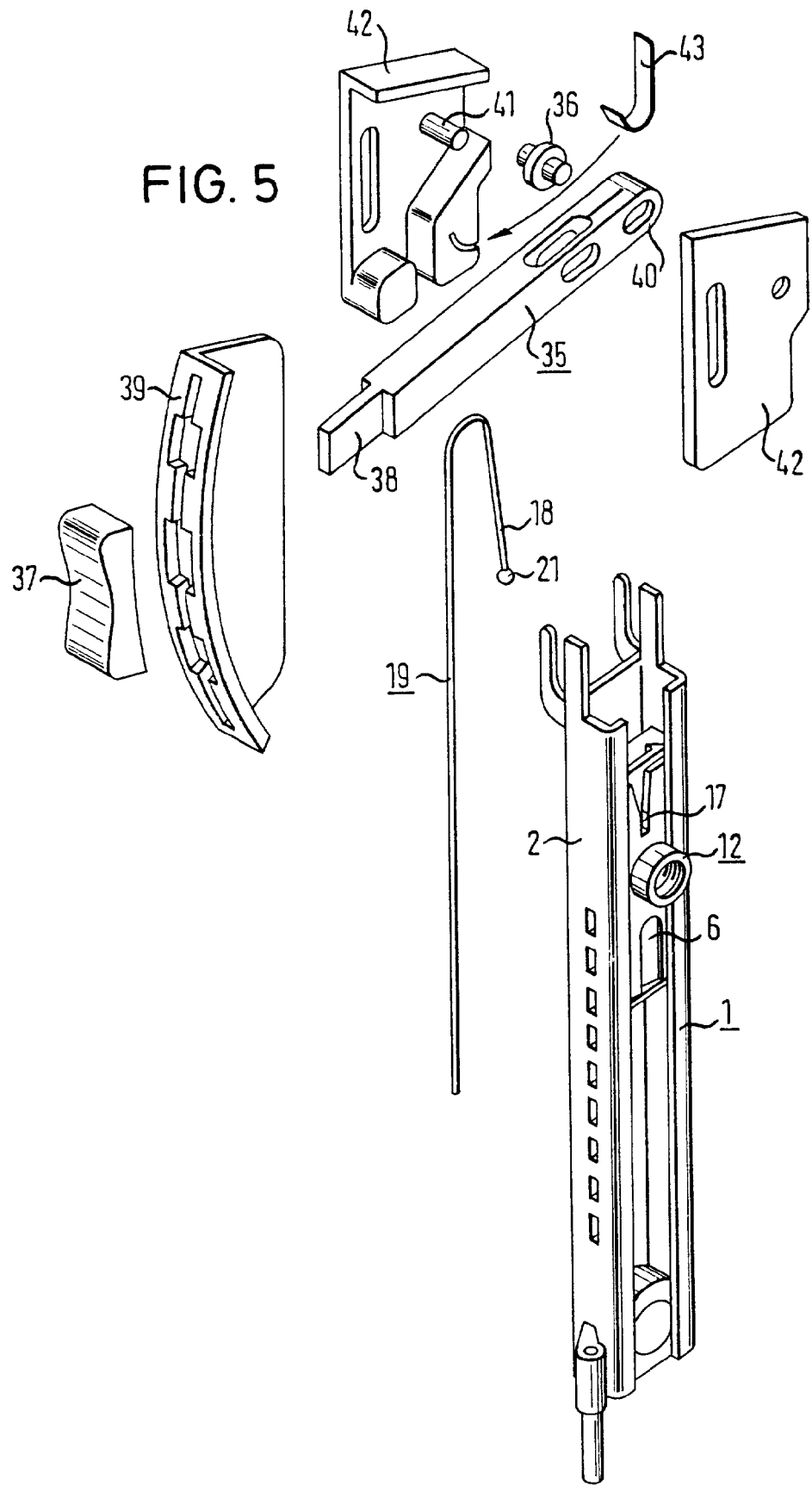

Embodiments of the invention are illustrated in the drawings and will be described in the following. There are shown, in each case in schematic illustration:

FIG. 1 a perspective plan view of a device in accordance with the invention,

FIG. 2 an exploded illustration of the device of FIG. 1,

FIG. 3 a detail of FIG. 2 in an enlarged side-view,

FIG. 4 a likewise enlarged front view of another detail of FIG. 2,

FIG. 5 an enlarged exploded illustration of a variant of the device of the invention, FIG. 6 a section through a part of a further variant of the device of the invention in the tensioned state, and FIG. 7 an illustration corresponding to FIG. 6 of this variant in the released state.

The height adjustment device of the invention shown in FIG. 1 for the deflection fitting of the safety belt comprises a rail 1 which is to be vertically mounted, for example to the B-column of a motor vehicle. The rail 1 has two side limbs 2 which are of C-shaped cross-section and which are connected to one another at the rear side of the rail by a rear wall 3. Latch recesses 4 are respectively provided in the side limbs 2 and, as shown, can, for example, be generated by pressing out corresponding sections 5 of the lateral limbs 2.

As one can see in FIG. 2, a two-part housing 6 is inserted into the rail 1, with the lower or rear part 7 of the housing being displaceably guided along the rail 1. The housing 6 accommodates a pawl 8 which can be pivoted together with the upper or top part of the housing 9 relative to the rear part of the housing 7 about a central axis I in order to prevent the upper part of the housing pivoting relative to the pawl 8, the pawl 8 is provided with recesses 26, into which corresponding projections provided on the upper part of the housing 9 engage, which are, however, not shown here. One of the two recesses 26 and the associated projection can in this arrangement be displaced relative to the central axis I in order to prevent faulty assembly by rotation of the pawl 8 and of the housing through 180° relative to one another.

The pawl 8 has a laterally projecting nose 10 and also a central guide passage 11, into which the narrow section 13 of a stepped spigot 12 is inserted with a press fit, as can be seen from FIG. 3. The narrower section 13 is formed as a threaded sleeve, which is guided through a central through-guide 14 in the upper part of the housing 9 and serves as a bearing or mount for a corresponding threaded bolt of a deflection fitting which is not shown here. The broader section 15 of the stepped spigot 12 has a diameter which is matched to the diameter of a cut-out 16 in the lower part 7 of the housing so that the broader section 15 of the stepped spigot 12 cooperates with the cut-out 16 in the lower part of the housing as a rotary bearing for the pawl 8 and for the upper part 9 of the housing.

The upper part 9 of the housing has, in its section disposed above the through-guide 14, a mount 17 for the end 18 of a Bowden cable 19, which is guided via a deflection device 20 to the housing upper part 9 from above. The end 18 of the Bowden cable 19 is provided with a thickened portion 21 which engages behind an associated edge in the mount 17 in the upper part of the housing 9. As one can, in particular, see from FIG. 4, the mount 17 for the Bowden cable 19 is horizontally displaced relative to the central axis I, about which the upper part 9 of the housing is rotatable.

The end 22 of a spiral spring 23, which is anchored at its other end in a spring mount 25, engages in a recess 24 provided in the lower section of the upper part 9 of the housing and displaced horizontally in the same direction relative to the central axis I. The spring mount 25 is in turn inserted into the lower end of the rail 1 and anchored to the latter. The torques produced by the displaced arrangement of the mount 17 and the recess 24 at the upper part of the housing 9 during vertical adjustment mutually cancel one another so that a displacement of the housing 6 within the rail 1 can take place without rotation and thus without latching of the pawl 8.

As one can see in FIGS. 1 and 2, the deflection device 20 is equipped with the deflection roller 27, at which the Bowden cable 19 is guided. In this manner the friction is reduced on actuation of the Bowden cable 19. As one can likewise see in FIGS. 1 and 2, the end 28 of the sleeve of the Bowden cable 19 is mounted in a mount 29 provided on the spring mount 25 at the side. In addition, the spring mount 25 has a central through-guide 30 through which a fastening bolt 31 can be passed through the intermediary of a locking ring 32 in order to secure the lower end of the rail 1 to the motor vehicle in this manner.

The upper end of the rail 1 is provided with two projections 33 which extend perpendicular to the plane of the rail, and in each of which an upwardly open slot 34 is formed. With these slots the rail 1 can be inserted into a corresponding mount provided at the motor vehicle. Thus only a single attachment bolt 31 is necessary for the attachment of the rail 1 in the motor vehicle. For the vertical adjustment of the deflection fitting, the length of the Bowden cable 19 which projects beyond the end of the sleeve 28 is correspondingly selected, with this taking place automatically in dependence on the position of the associated vehicle seat. The connection to the vehicle seat is arranged here in such a way that when the vehicle seat is located in the frontmost position, the greatest length of the Bowden cable 19 is present, so that the housing 6 for the deflection fitting is moved as a result of the force of the spiral spring 23 into the lowest position in the rail 1, whereas, in the rearmost position of the motor vehicle seat, the Bowden cable 19 draws the housing 6 with the mount 12 for a deflection fitting which is present on the pawl 8 into the uppermost position against the force of the spiral spring 23. In order to compensate for different paths of displacement of the vehicle seat and of the deflection fitting, a gearing device can be provided for the Bowden cable. During the displacement of the housing 6 without loading of the mount 12, no resulting torque acts on the pawl 8, as explained, so that the pawl 8 remains in its unlatched position during the vertical adjustment.

During an accident, the pawl 8 is loaded by the safety belt via the deflection fitting and its mount 12, with the force which is transmitted always having a component directed downwardly in the rail direction. This force, which pulls the pawl 8 downwardly, counteracts the holding force of the Bowden cable 19 specified by the seat position which is transferred to the pawl displaced relative to the central axis I. In this way a resultant torque acting on the pawl 8 arises which rotates the pawl 8 about the central axis I until the lateral nose 10 of the pawl 8 latches into one of the lateral latch recesses 4 of the rail 1. In this way a further movement of the pawl 8 and thus of the deflection fitting journalled in the mount 12, along the rail 1 is blocked.

The device of the invention represents a simply constructed, automatically vertically adjustable device for the mounting of the upper attachment or deflection fitting for a safety belt which, in the case of an accident, ensures a rapid and reliable blocking of the deflection fitting. Only a few components are necessary and can, moreover, apart from the upper housing part 9, be used both for left hand installation as well as for right-hand installation in a motor vehicle. This both reduces the manufacturing costs and also simplifies the storage and installation.

In order to make an individual adaptation of the level of the deflection fitting possible in addition to the automatic vertical adjustment in dependence on the seat position, the deflection device 20 can be arranged at the upper side of the rail 1, so that the spacing of the deflection roll 27 from the upper end of the rail 1 is manually adjustable. By enlargement of the spacing, the path of the Bowden cable 19 to the mount 17 in the upper part of the housing 9 is extended so that with an unchanged seat position the housing 6 with the bearing 12 of the deflection fitting is displaced upwardly. Vice versa, the housing 6 can be displaced downwardly by reduction of the spacing.

FIG. 5 shows such a deflection device 20 with a deflection element for the Bowden cable 19, which is additionally manually adjustable height-wise. A deflection roll 36 journalled in a lever element 35 is provided as the deflection element, with the Bowden cable 19 running over the deflection roll 36. The lever element 35 is guided at its one tapered end 38 by a latched guide 39 and carries at this end 38 an actuating element 37 which can be pushed into place. The other end 40 of the lever element 35 is rotatably mounted on a pin 41 which is accommodated in a housing 42. A spring 43 is anchored at its one end in the housing 42, with the other end of the spring engaging on the lever element 35 and loading the lever element 35 into its lower pivotal position.

By pivoting of the lever element 35 about the pin 41, the deflection roll 36 journalled in the lever element 35 is raised or lowered. In this way the lever element 35 latches into the latched positions provided by the latch guide 39. Through the arrangement of the actuating element 37 at the end 38 remote from the pivot axis of the lever element 35, a larger lever arm is available for the actuation of the lever element 35 so that the deflection roll 36 journalled closer to the pivot axis can easily be lifted together with the deflection fitting.

In the partial cross-section through a further variant of the apparatus of the invention as shown in FIG. 6, a bow member 44 resembling a coat hanger or bow and having two resilient limbs 45, 46 is provided in the pawl 8 and is braced with its one limb 45 against the pawl 8 and with its other limb 46 against the sliding member 7. The bow member 44 sits for this purpose in a recess 48 of the pawl 8, forming an abutment edge 47 for the limbs 45, 46 of the bow member 44, with the recess 48 being so dimensioned that the bow member's two legs 45, 46 can be moved between a non-spread position in which the limbs 45, 46 contact the abutment edge 47, and a spread position in which the two legs 45, 46 are swung further apart. The recess 48 opens at one side into a lateral opening 49 in the pawl 8, through which and out of which the one limb 46 of the bow member 44 can project in the spread position and can brace itself against the sliding member 7.

The recess 48 for the bow member 44 is so arranged in the region of the mount 17 for the end 18 of the Bowden cable 19 that the thick portion or nipple 21 of the Bowden cable 19 comes to lie in the recess 48 when the Bowden cable is inserted. In this arrangement, the Bowden cable 19 is not only mounted into the mount 17 but rather also mounted at the same time into the correspondingly shaped bow member 44 so that in the tensioned state the Bowden cable 19 draws the bow member 44 against the abutment edge 47 formed by the recess 48. The spiral spring 23 which acts on the pawl 8 in the opposite direction hereby acts as a counter-force.

When the Bowden cable 19 is tensioned and when the counter-force of the spiral spring is present, the bow member 44 is thus located in its position held against the contact edge 47. The two limbs 45 and 46 of the bow member 44 thus pivot together to such an extent that the limb 46 is located within the pawl 8 and is not supported on the slide member 7. The bow member 44 holds this non-spread position independently of the displacement position of the Bowden cable 19 for as long as the tension force exerted by the Bowden cable 19 and the spiral spring 23 and the pawl 8 is present. If the Bowden cable tears or is shifted out of place, or if the spiral spring breaks, then this tension force disappears. The bow member 44 is then no longer drawn against the contact edge 47 so that it spreads and its one limb 46 moves out of the opening 49 in the pawl 8. This limb 46 is then braced on the confronting inner wall of the sliding member 7 so that a turning force is exerted onto the pawl 8 via the other limb 45 of the bow member 44. This turning force acts in the latching direction of the pawl 8 so that the pawl 8 latches into one of the latched recesses 4 and blocks the sliding member with the bearing 12 for the deflection fitting against a further displacement.

With little effort and without additional space requirement it is thus ensured that a reliable latching of the pawl 8 and thus a blocking of the vertical adjustment of the upper deflection fitting of the safety belt system is ensured in an emergency, even if the Bowden cable breaks or is shifted out of its mounting, or if a spring breakage occurs.

REFERENCE NUMERAL LIST

| | |
|---|---|
| 1 | rail |
| 2 | limb |
| 3 | rear wall |
| 4 | latch recess |
| 5 | section of 2 |
| 6 | housing |
| 7 | housing lower part |
| 8 | pawl |
| 9 | housing upper part |
| 10 | nose |
| 11 | through-guide |
| 12 | stepped spigot |
| 13 | narrow section of 12 |
| 14 | through-guide |
| 15 | broader section of 12 |
| 16 | recess |
| 17 | mount |
| 18 | end of 19 |
| 19 | Bowden cable |
| 20 | deflection device |
| 21 | thickened portion, nipple |
| 22 | end of 23 |
| 23 | spiral spring |
| 24 | mount |
| 25 | spring sleeve |
| 26 | recess |
| 27 | deflection roll |
| 28 | end of sleeve |
| 29 | mount |
| 30 | through-guide |
| 31 | bolt |
| 32 | locking ring |
| 33 | projection |
| 34 | slot |
| 35 | lever element |
| 36 | deflection element |
| 37 | actuating element |
| 38 | end of 35 |
| 39 | latch guide |
| 40 | end of 35 |
| 41 | pin |
| 42 | housing |
| 43 | spring |
| 44 | bow member |
| 45 | limb |
| 46 | limb |
| 47 | contaat edge |
| 48 | recess |
| 49 | opening |
| 50 | connection point |
| I | central axis |
| II | axis of rotation of 35 |

We claim:

1. Device for the automatic and vertically adjustable mounting of the upper attachment fitting or deflection fitting for a safety belt in a motor vehicle, the device comprising a substantially vertically arranged rail (1) having lateral latch recesses (4), a slide member (7) which is displaceably guided along the rail and in which a pawl (8) having a laterally protecting latch nose (10) is pivotally mounted about an axis (I) perpendicular to the longitudinal direction of the rail for movement between a latched position and an unlatched position, an adjustment element (19) which acts on the pawl (8) in the one direction of displacement and is controlled in dependence on the seat position of the associated vehicle seat, and with a bearing (12) for the deflection fitting moveable with the sliding member, with the bearing acting on the pawl (8) in such a way that the pawl (8) is pivoted into its latched position when the bearing (12) is loaded by the belt, characterized in that a resetting element (23) is provided which acts on the pawl (8) in the other direction of displacement, and in that the adjustment element (19) and the resetting element (23) act on the pawl (8) at two points (17, 24) arranged on the same side of the pivot axis (I).

2. Device in accordance with claim 1, characterized in that the bearing (12) for the deflection fitting is arranged on the pawl (8) horizontally displaced relative to the point of action (17) of the adjustment element (19).

3. Device in accordance with claim 2, characterized in that the sliding member (7) has a preferably central rotary bearing (16) for the pawl (8).

4. Device in accordance with claim 3, characterized in that the bearing (12) for the deflection fitting present at the pawl (8) is provided on the axis of rotation (I) of the pawl (8) in the sliding member (7).

5. Device in accordance with claim 4, characterized in that the pawl (8) has a through-guide (11) through which a narrower section (13) of an elongate stepped spigot (12) is passed, which serves as a bearing for the deflection fitting; in that the broader section (15) of the spigot (12) is formed as a rotary bearing spigot, which is rotatably journalled in a corresponding circular recess (16) of the slide member (7).

6. Device in accordance with claim 1, characterised in that the pawl (8) is journalled in a two-part housing (6), the lower housing part (7) of which serves as the slide member and the upper housing part (9) of which is pivotable together with the pawl (8) relative to the housing lower part (7) in the plane of the rail, with the adjustment element (19) and the resetting element (23) acting on the upper part (9) of the housing.

7. Device in accordance with claim 1, characterized in that a cable, in particular a Bowden cable (19) serves as the adjustment element.

8. Device in accordance with claim 7, characterized in that the cable (19) is guided over a deflection device (20) and acts from above on the pawl (8) or on the upper part (9) of the housing.

9. Device in accordance with claim 7, characterised in that a spiral spring (23) is provided as the resetting element and is mounted in a spring sleeve (25) which can be anchored in the rail (1) and which has a central through-guide (30) for an attachment bolt (31).

10. Device in accordance with claim 9, characterized in that a lateral mount (29) for the end (28) of the sleeve of the Bowden cable (19) is provided at the spring sleeve (25).

11. Device in accordance with claim 1, characterised in that a spreading spring element (44) is provided at the pawl (8) and is held in the non-spread position by the tension force acting between the ajustment element (19) and the resetting element (23), and in that the spreading spring element (44) is so arranged between the pawl (8) and the slide member (7), or between the pawl (8) and the rail (1), that the pawl (8) is loaded in the direction towards its latched position when the tension force from the spreading spring element (44) falls away.

12. Device in accordance with claim 11, characterized in that the spreading spring element is formed as a bow member (44) with two resilient limbs (45, 46), with the bow member being braced in its spread state with its one limb (45) on the pawl (8) and with its other limb (46) on the slide member (7), and with the length of its span being variable in dependence on the tension force.

13. Device in accordance with claim 12, characterized in that the pawl (8) has a contact edge (47) for at least one part of the two limbs (45, 46) of the bow member (44); and in that the bow member (44) is held by the tension force against the contact edge (47) in such a way that the two limbs are pivoted together to such an extent that the pawl (8) is relieved from the tension force of the bow member (44).

14. Device in accordance with claim 13, characterized in that the contact edge (47) is formed by a recess (48) in the region of the point of action (17) of the adjustment element (19) at the pawl (8); and in that the adjustment element (19) acts at the connection point (50) of the two limbs (45, 46) of the bow member (44) and draws the bow member towards the contact edge (47).

15. Device for the automatic vertically adjustable mounting of the upper attachment or deflection fitting for a safety belt in a motor vehicle, the device comprising a substantially vertically arranged rail (1) which has lateral latch recesses (4), a guide member (7), which is displaceably guided along the rail (1) and in which a pawl (8) with a laterally projecting latching nose (10) is pivotally mounted about an axis (I) perpendicular to the longitudinal direction of the rail for movement between a latched position and an unlatched position, and a Bowden cable (19) which acts on the pawl (8) from above in the direction of displacement and is guided over a deflection device (20) present above the rail (1), in particular a device, characterized in that the spacing of the deflection device (20) for the Bowden cable (19) from the upper end of the rail (1) is manually adjustable.

16. Device in accordance with claim 15, characterized in that the deflection device (20) has a lever element (35) which is rotatably mounted about a substantially horizontal axis (II), with the lever element carrying a deflection element ((36) for the Bowden cable (19) and an actuating element (37); and in that the deflection element (36) is arranged closer to the axis of rotation (II) of the lever element (35) than the actuating element (37).

17. Device in accordance with claim 15, characterised in that a rotatable journalled deflection roller (27) is provided for the deflection of the Bowden cable (19).

18. Device in accordance with claim 15, characterised in that the rail (1) is provided with latch recesses (4) at two oppositely disposed sides.

19. Device in accordance with claim 15, characterised in that the rail (1) has slots (33) at its upper end, permitting it to be hung into a mount present at the vehicle.

* * * * *